United States Patent [19]
Gupta et al.

[11] 4,002,806
[45] Jan. 11, 1977

[54] SECONDARY BATTERY OR CELL

[75] Inventors: Nirmal K. Gupta, Plymouth; Frank A. Ludwig, Southfield, both of Mich.

[73] Assignee: Ford Motor Company, Dearborn, Mich.

[22] Filed: Aug. 20, 1975

[21] Appl. No.: 605,943

[52] U.S. Cl. .................. 429/104; 429/105
[51] Int. Cl.² .............................. H01M 43/00
[58] Field of Search .............. 136/6 FS, 6 R, 6 F, 136/20, 83 R, 83 T, 100 R, 153, 137; 429/104, 105, 102

[56] References Cited
UNITED STATES PATENTS

| | | | |
|---|---|---|---|
| 3,413,150 | 11/1968 | Kummer et al. | 136/6 FS |
| 3,468,709 | 9/1969 | Kummer | 136/6 F |
| 3,554,806 | 1/1971 | Greenberg et al. | 136/6 FS |
| 3,672,995 | 6/1972 | Brown et al. | 136/6 FS |
| 3,718,505 | 2/1973 | Werth | 136/6 LF |
| 3,758,337 | 9/1973 | Fally et al. | 136/6 FS |
| 3,811,943 | 5/1974 | Minck et al. | 136/6 FS |

*Primary Examiner*—Anthony Skapars
*Attorney, Agent, or Firm*—Roger L. May; Keith L. Zerschling

[57] ABSTRACT

An improved secondary battery or cell of the type having (A) one or more anodic reaction zones containing a molten alkali metal reactant-anode in electrical contact with an external circuit, (B) one or more cathodic reaction zones containing (i) a cathodic reactant which, when the battery or cell is in the theoretically fully charged state, consists of sulfur and which, when the battery or cell is at least partially discharged, is selected from the group consisting of (a) a single phase composition comprising a molten polysulfide salt of said anodic reactant and (b) a two phase composition comprising molten sulfur and molten sulfur saturated polysulfide salts of said anodic reactant and (ii) an electrode of porous conductive material which is at least partially immersed in said cathodic reactant, and (c) a cation-permeable barrier to mass liquid transfer interposed between and in contact with said anodic and cathodic reaction zones, said porous, conductive material being in electrical contact with both said cation-permeable barrier and an external circuit. The improvement comprises increasing the charge/discharge capacity of the battery or cell by including in said cathodic reactant controlled amounts of certain metals, alloys comprising such metals, salts of such metals and oxides of such metals.

13 Claims, 4 Drawing Figures

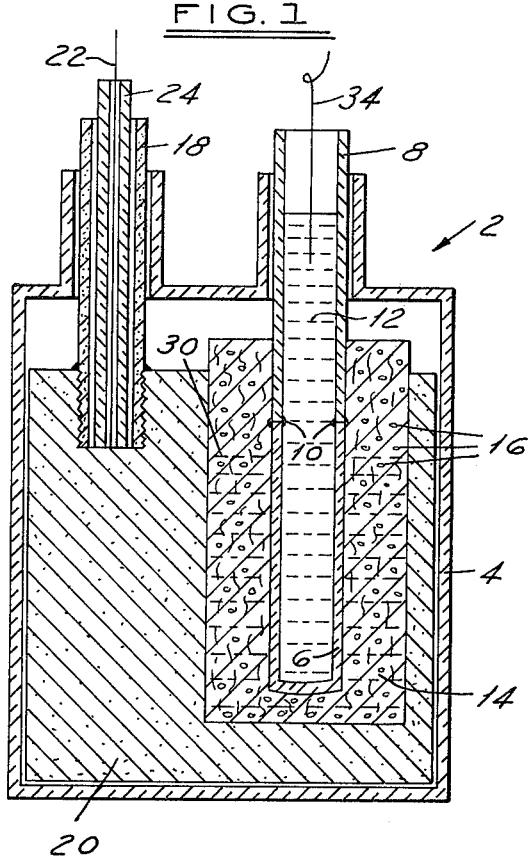
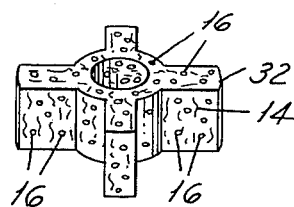
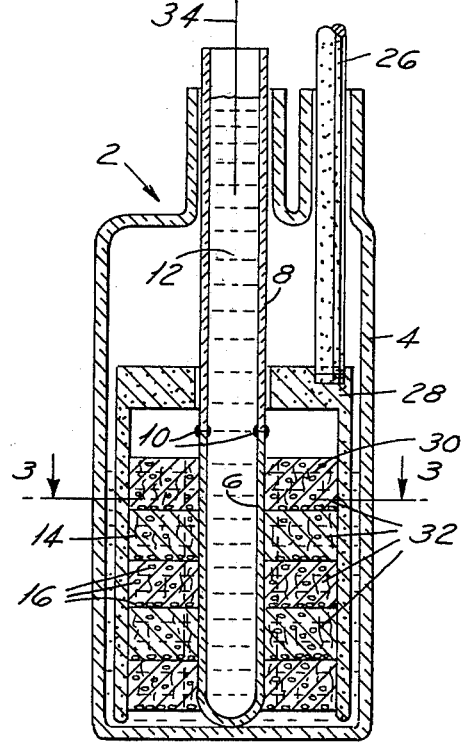
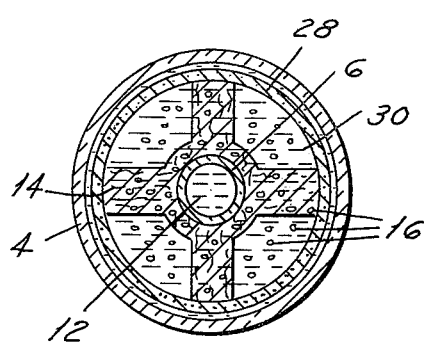

SECONDARY BATTERY OR CELL

The invention herein described was made in the course of or under a contract or subcontract thereunder with the National Science Foundation.

This application relates to an improved secondary battery or cell of increased capacity.

More particularly, this application relates to an improved secondary battery or cell of the type comprising at least one molten alkali metal anode, at least one cathode, a liquid electrolyte electrochemically reversibly reactive with said alkali metal and in contact with said cathode, and a cation-perpermeable barrier to mass liquid transfer interposed between and in contact with said anode and said liquid electrolyte.

This application still more particularly relates to an improved sodium-sulfur cell or battery of increased capacity.

BACKGROUND OF THE INVENTION

A recently developed type of secondary or rechargeable electrical conversion device comprises: (1) an anodic reaction zone containing a molten alkali metal anode-reactant, e.g., sodium, in electrical contact with an external circuit; (2) a cathodic reaction zone containing (a) a cathodic reactant comprising a liquid electrolyte, e.g., sulfur or a mixture of sulfur and molten polysulfide, which is electrochemically reversibly reactive with said anodic reactant, and (b) a conductive electrode which is at least partially immersed in said cathodic reactant; and (3) a solid electrolyte comprising a cation-permeable barrier to mass liquid transfer interposed between and in contact with said anodic and cathodic reaction zones. As used herein the term "reactant" is intended to means both reactants and reaction products.

During the discharge cycle of such a device, molten alkali metal atoms such as sodium surrender an electron to an external circuit and the resulting cation passes through the solid electrolyte barrier and into the liquid electrolyte to unite with polysulfide ions. The polysulfide ions are formed by charge transfer on the surface of the porous electrode by reaction of the cathodic reactant with electrons conducted through the porous electrode from the external circuit. Because the ionic conductivity of the liquid electrolyte is less than the electronic conductivity of the porous electrode material, it is desirable during discharge that both electrons and sulfur be applied to and distributed along the surface of the porous conductive material in the vicinity of the cation-permeable solid electrolyte. When the sulfur and electrons are so supplied, polysulfide ions can be formed near the solid electrolyte and the alkali metal cations can pass out of the solid electrolyte into the liquid electrolyte and combine to form alkali metal polysulfide near the solid electrolyte.

During the charge cycle of such a device when a negative potential larger than the open circuit cell voltage is applied to the anode the opposite process occurs. Thus electrons are removed from the alkali metal polysulfide by charge transfer at the surface of the porous electrode and are conducted through the electrode material to the external circuit, and the alkali metal cation is conducted through the liquid electrolyte and solid electrolyte to the anode where it accepts an electron from the external circuit. Because of the aforementioned relative conductivities of the ionic and electronic phases, this charging process occurs preferentially in the vicinity of the solid electrolyte and leaves behind molten elemental sulfur.

It has been customary to prepare cells or batteries of this type without regard to the presence of corrodable materials or other impurities, particularly in the presence of the cathodic reactants. Thus, the cell or battery container may have been made of metal, e.g. stainless steel, and the porous electrode may have been formed of metal, e.g., a stainless steel felt. Although such cells demonstrate excellent rechargeability characteristics initially, they tend to show decreased capacity with each successive cycle. An examination of such prior art cells that have deteriorated in their charge/discharge capacity to the point of failure has shown that the shortened cycle life and deterioration of charge/discharge capacity of these cells might be attributed, at least in part, to the corrosion of the metal container or electrode, the accumulation of metal corrosion products on the solid electrolyte surface, the accumulation of corrosion products within the porous electorde and decreased mobility of sodium polysulfide within the porous electrode as a result of such corrosion product accumulation.

In order to solve the problems of decreased cycle life and deteriorating charge/discharge capacity it has been proposed to prepare the cell or battery so as to exclude metal or metal compound impurities, particularly corrosion products resulting from polysulfide attack on metal cell parts. The absence of such impurities can be reasonably assured by employing both an electrode and a container of such a nature that it will not contaminate the cathodic reactant during operation of the cell or battery. The exclusion of corrodable surfaces from the cell or battery, particularly from the cathodic reaction zone may be accomplished in numerous ways. Thus, the container and electrode may be formed from inherently noncorroding, conductive materials, or they may be treated in some way so as to render them noncorrodable, but still conducting. Also, the container could be formed from noncorroding, nonconductive materials such as glass or ceramic and electrical contact between the electrode and the external circuit made by current lead through rather than through the container body. Another possibility would be to provide the container with a noncorroding, protective liner which may or may not be conductive. Still further ways of excluding corrosion products from the cell may be apparent to those skilled in the art. Those mentioned above are merely exemplary of precautions which may be taken and do not constitute a part of the invention described in this application.

Preparing cells or batteries free of metals or metal compound impurities does result in a significant increase of charge/discharge cycle life and a stabilization of charge/discharge capacity. However, such cells, after initial discharge, do not recharge to the extent that those cells containing impurities do. Thus, these cells exhibit reduced charge/discharge capacity.

The improved cell or battery of this invention overcomes the problems of lack of capacity found in the metal-free or noncorroding cells and yet retains many of the benefits of such cells such as long cycle life and stabilized capacity.

BRIEF DESCRIPTION OF THE INVENTION

The aforementioned advantages are achieved in accordance with the improvement of this invention by incorporating within the cathodic reaction zone of an otherwise metal or metal compound-free cell or battery controlled amounts of particulate metals or metal compounds. More particularly the invention comprises including controlled amounts of certain metals, alloys comprising such metals, certain salts of such metals, oxides or such metals or mixtures thereof in the cathodic reactant of the cell or battery.

The invention will be more fully understood after reading the following detailed description of the invention in conjunction with the drawings in which:

FIG. 1 is a vertical sectional view of a first type of cell including the improvement of the invention;

FIG. 2 is a vertical sectional view of a second type of cell embodying the improvement of the invention;

FIG. 3 is a cross-sectional view of the cell of FIG. 2 taken along line 3—3 of FIG. 2; and FIG. 4 is a perspective cross-sectional view of a portion of the porous electrode of FIG. 4.

DETAILED DESCRIPTION OF THE INVENTION

Description of Device to Which improvement Applies

The secondary or rechargeable electrical conversion devices to which the improvement of this invention applies and various components thereof are disclosed in the following United States patents, the disclosures of which are incorporated herein by reference: U.S. Pat. Nos. 3,404,035; 3,404,036; 3,413,150; 3,446,677; 3,458,356; 3,468,709; 3,468,719; 3,475,220; 3,475,223; 3,475,225; 3,535,163; 3,719,531 and 3,811,493.

As mentioned above, the secondary electrical conversion devices to which the improvement of this invention applies comprise generally: (1) an anodic reaction zone containing a molten alkali metal reactant-anode in electrical contact with an external circuit; (2) a cathodic reaction zone containing (a) a cathodic reactant comprising a liquid electrolyte selected from sulfur or a mixture of sulfur and sulfur saturated polysulfide of said molten alkali metal reactant which is electrochemically reversibly reactive with said anodic reactant and (b) an electrode of porous conductive material which is at least partially immersed in said cathodic reactant and (3) a cation-permeable barrier to mass liquid transfer interposed between and in contact with said anodic and cathodic reaction zones, said porous conductive material being in electrical contact with both said cation-permeable barrier and the external circuit.

The anodic reactant employed in such devices is an alkali metal which is maintained above its melting point when the device is in operation. The anodic reactant is heated by any conventional means including, not by way of limitation, Joule heating, induction heating, and heat exchange with a suitable fluid. The anodic reactant may also be viewed as the anode proper or conductor through which the electron flow to the external circuit is achieved. A cell component of this type in conventionally referred to in the art as a sacrificial electrode in that while it is serving the role of a conductor, it is also undergoing electrochemical reaction. Molten sodium is employed as the anodic reactant in most preferred embodiments of such devices. However, potassium, lithium, other alkali metals, mixtures of such alkali metals, or alloys containing such alkali metals can be used.

The cathodic reactant is a molten material which is electrochemically reversibly reactive with the anodic reactant. As the device begins to discharge, the mole fraction of elemental sulfur drops while the open circuit voltage remains constant. During this portion of the discharge cycle as the mole fraction of sulfur drops from 1.0 to approximately 0.72 the cathodic reactant displays two phases, one being essentially pure sulfur and the other being sulfur saturated alkali metal polysulfide in which the molar ratio of sulfur to alkali metal is about 5.2:2. When the device is discharged to the point where the mole fraction of sulfur is about 0.72 the cathodic reactant becomes one phase in nature since all elemental sulfur has formed polysulfide salts. As the device is discharged further, the cathodic reactant remains one phase in nature and as the mold fraction of sulfur drops so does the open circuit voltage corresponding to the change in the potential determining reaction. Thus, the device continues to discharge from a point where polysulfide salts contain sulfur and alkali metal in a molar ratio of approximately 5.2:2 to the point where polysulfide salts contain sulfur and alkali metal in a ratio of about 3:2. At this point the device is fully discharged.

On recharging the reverse of the above occurs. Theoretically the battery or cell should recharge to the point where nearly all polysulfide is converted to sulfur. However, such efficiency is not achieved even under the best circumstances. Many of the noncorroding metal and metal compound free cells discussed above do not charge past the single phase region of the sulfur/polysulfide and do not exhibit the charge/discharge capacity desired. Even those which do recharge into the two phase sulfur saturated polysulfide region do not recharge as far into that 2-phase region as would be desirable.

As the device is charged or discharged, the relative concentrations of sulfur and alkali metal thus vary considerably.

The anodic reactant is separated from the cathodic reactant by a solid barrier to mass liquid transfer that is selectively ionically conductive with respect to cations of the anodic reactant and substantially impermeable to other ions which may be stored in the cathodic reactant. Thus, the reaction zone separator or solid electrolyte is a material which will permit the transfer of the ions of the anodic reactant through the separator and into the cathodic reactant during operation of the device. The cathodic reactant together with the separator provides a sufficient barrier to free electron flow in the internal portion of the electrical circuit to permit a difference of potential to develop at the respective electrodes of the devices in operation. It is preferred that the separator be as thin as possible without unduly sacrificing strength. Although optimum thickness may vary with intended use, separators having a thickness in the range of about 20 to about 2,000 preferably about 100 to about 1,000, microns have been found to be effective.

Both glasses and polycrystalline ceramic materials have been found suitable for use in such devices as the solid electrolyte or reaction zone separators. Among the glasses which may be used with such devices and which demonstrate an unusually high resistance to attack by molten alkali metal are those having the following composition: (1) between about 47 and about 58 mole percent sodium oxide, about 0 to about 15, preferably about 3 to about 12 mole percent of aluminum oxide and about 34 to about 50 mole percent of silicon dioxide; and (2) about 35 to about 65 preferably, about 47 to about 58, mole percent sodium oxide, about 0 to about 30, preferably about 20 to about 30, mole percent of aluminum oxide, and about 20 to about 50, preferably about 20 to about 30, mole percent boron oxide. These glasses may be prepared by conventional glass making procedures using the listed ingredients and firing at temperatures of about 2700° F.

The polycrystalline ceramic materials useful as reaction zone separators of solid electrolytes are bi- or multi-metal oxides. Among the polycrystalline bi- or multi-metal oxides most useful in the devices to which the process of this invention applies are those in the family of Beta-alumina all of which exhibit a generic crystalline structure which is readily identifiable by X-ray diffraction. Thus, Beta-type alumina or sodium Beta-type-alumina is a material which may be thought of as a series of layers of aluminum oxide held apart by columns of linear Al—O bond chains with sodium ions occupying sites between the aforementioned layers and columns. Among the numerous polycrystalline Beta-type-alumina materials useful as reaction zone separators or solid electrolytes are the following:

1. Standard Beta-type-alumina which exhibits the above-discussed crystalline structure comprising a series of layers of aluminum oxide held apart by layers of linear Al—O bond chains with sodium occupying sites between the aforementioned layers and columns. Beta-type-alumina is formed from compositions comprising at least about 80% by weight, preferably at least about 85% by weight, of aluminum oxide and between about 5 and about 15 weight percent, preferably between about 8 and about 11 weight percent, of sodium oxide. There are two well known crystalline forms of Beta-type-alumina, both of which demonstrate the generic Beta-type-alumina crystalline structure discussed hereinbefore and both of which can easily be identified by their own characteristic X-ray diffraction pattern. Beta-alumina is one crystalline form which may be represented by the formula $Na_2O \cdot 11Al_2O_3$. The second crystalline form is $\beta''$-alumina which may be represented by the formula $Na_2O \cdot 6Al_2O_3$. It will be noted that the $\beta''$ crystalline form of Beta-type-alumina contains approximately twice as much soda (sodium oxide) per unit weight of material as does the Beta-alumina. It is the $\beta''$-alumina crystalline structure which is preferred for the formation of solid electrolyte or reaction zone separators for the device to which the process of this invention is applicable. In fact, if the less desirable beta form is present in appreciable quantities in the final ceramic, certain electrical properties of the body will be impaired.

2. Boron oxide $B_2O_3$ modified Beta-type-alumina wherein about 0.1 to about 1 weight percent of boron oxide is added to the composition.

3. Substituted Beta-type-alumina wherein the sodium ions of the composition are replaced in part or in whole with other positive ions which are preferably metal ions.

4. Beta-type-alumina which is modified by the addition of a minor proportion by weight of metal ions having a valence not greater than 2 such that the modified Beta-type-alumina composition comprises a major proportion by weight of ions of aluminum and oxygen and a minor proportion by weight of a metal ion in crystal lattice combination with cations which migrate in relation to the crystal lattice as result of an electric field, the preferred embodiment for use in such electrical conversion devices being wherein the metal ion having a valence not greater than 2 is either lithium or magnesium or a combination of lithium and magnesium. These metals may be included in the composition in the form of lithium oxide or magnesium oxide or mixtures thereof in amounts ranging from 0.1 to about 5 weight percent.

The cathodic electrode or porous conductive material is in electrical contact, and preferably in physical contact, with both the cation-permeable barrier and the container in which the electrical conversion device is housed. The conductive material is of significantly greater surface area than a solid cathode and may comprise any porous material which is electronically conductive and which is resistant to attack by reactants within the cathodic reaction zone. Among the materials which may be employed are felts or foams of graphite or vitreous carbons.

The secondary cells or batteries to which the improvement of the invention is applicable may have a number of different configurations, several of which are disclosed in the above-incorporated patents. Several configurations are particularly preferred. One such design is disclosed in U.S. Pat. No. 3,811,943. The device disclosed therein exhibits greatly improved mass transpotation of reactants and reaction products to and from the vicinity of the solid electrolyte and electrodes and provides maximum utilization of the area of the solid electrolyte and electrode despite the volume changes of the reactants. In the device an ionically conductive electrolyte is located between a first reactant in one container and a second reactant in another container. A layer of porous conductive material has one surface in contact with one side of the ionically conductive electrolyte and the other surface in contact with a structually integral, electronically conductive member permeable to mass flow of reactants and electrically connected to the external circuit. An open volume exists between the structurally integral conductive member and the container wall to promote free flow and mixing of the reactants. Reactants flow readily through the integral conductive member into the layer of porous conductive material. It should be understood that the integral conductive member of this device as disclosed in the patent may be corrodable and, as such, would require treatment to avoid such corrosion.

A second type of preferred configuration comprises: (1) a tubular container; (2) a tubular cation-permeable barrier to mass liquid transfer which is disposed within said tubular container so as to create an anodic reaction zone within said tubular barrier and said tubular container; (3) a molten alkali metal anodic reactant within said anodic reaction zone in electrical contact with an external electrical circuit; (4) a cathodic reactant comprising a liquid electrolyte which is electrochemically reversibly reactive with said anodic reactant and which in the discharged state is selected from the group consisting of (a) a single phase composition comprising molten polysulfide salts of said anodic reactant and (b) a two phase composition comprising molten sulfur and molten sulfur saturated polysulfide salts of said anodic reactant; and (5) an electrode of porous conductive material which is disposed within said cathodic reaction zone, immersed at least in part in a cathodic reactant and is in physical contact with the tubular barrier and the tubular container and in electrical contact with said tubular barrier and an external circuit. Such tubular or cylindrical secondary cells thus comprise cathodic reaction zones which completely surround the solid electrolyte or reaction zone separator.

A particularly preferred cell design is disclosed in U.S. patent application Ser. No. 545,048 filed Jan. 29, 1975 in the name of Frank A. Ludwig et al which is assigned to the assignee of this application. The improved design disclosed in that application relates to the porous cathodic electrode and may be used in conjunction with many of the cell structures known in the prior art. The improvement of that device involves disposing a porous electrode within the cathodic reaction zone so as to form a plurality of channels or spaces within said zone which are free of said porous conductive material and which in combination with the porous conductive material are adapted to allow flow within the cathodic reaction zone of the molten cathodic reactant.

Improvement of the Invention

The improvement of this invention involves increasing the charge/discharge capacity of the batteries or cells described hereinbefore by including in the cathodic reactant of the cell between about 0.001 and about 10, preferably between about 0.001 and about 1.0 and most preferably between about 0.001 and about 0.1, weight percent based on the total weight of the cathodic reactant of an additive selected from certain metals, metal salts and metal oxides. The additive is preferably added as particles, which may range in size up to approximately 1,000 microns. Many useful powders have an average particle diameter of 1 to 5 microns.

The additives useful in the improvement of the invention may be selected from:
  i. metals selected from the group consisting of (a) metals from Groups I, II and III of the Periodic Table of Elements, (b) Transition Series Metals, and (c) antimony, lead, tin and bismuth;
  ii. alloys comprising the metals of (i);
  iii. salts of the metals of (i);
  iv. oxides of the metals of (i);
  v. phosphides, arsenides, antimonides, carbides and nitrides of the metals of (i); and
  vi. mixtures of (i) through (v).

The metal salts useful in the invention are preferably selected from the groups consisting of halides, nitrates, nitrites, thiocyanates, sulphates, sulfides (or polysulfides), hydroxides and mixtures thereof. The salts are most preferably sulfides or polysulfides.

Many metal salts and metal compounds, such as the nitrates or nitrites will react with sulfur or alkali metal polysulfide to form salts such as sulfides, polysulfides, etc. Many metals will also react to form metal sulfides or polysulfides. In some cases it may be disirable to add these materials as the metal or metal compound rather than the sulfide or polysulfide.

Several mechanisms are suggested below to account for the improvement obtained in the performance of the Na/S battery or cell as a result of the inclusion of the aforementioned additives. It should be understood, however, that these are possible mechanisms and are not intended to be limiting.

1. Sulfur preferentially wets graphite or carbon whereas polysulfide preferentially wets metals or metallic compounds or any materials of polar or ionic character or with available d-orbitals for bonding. On charging of the Na/S battery the graphite or carbon electrode becomes wetted by sulfur, an insulator, and charging stops, thereby limiting the charging capacity between approximately $Na_2S_3$ and approximately $Na_2S_5$. If the aforementioned metallic materials are added to the melt, they can partially or completely coat the electrode and change the wetting properties of the electrode surface so that charging can proceed past $Na_2S_5$ to essentially pure sulfur (a small amount of polysulfide must remain so that ionic conductivity is maintained).

2. Many metal salts, metal salt mixtures and other compounds (e.g., chlorides and sulfides of lead, antimony, thallium, iron and silver; and oxides, arsenides, phosphides, antimonides, carbides and nitrides of many of the metals in (i) above) exhibit electronic and mixed ionic-electronic conductivity. When these compounds or mixtures of these compounds are dissolved in or mixed with the polysulfide melt, they impart general or localized electronic conductivity to the melt, thereby extending the effective electrode area, altering the electrode kinetics and improving the charge and discharge characteristics of the cell or battery, with the charge capacity being particularly improved.

Many salts, oxides and other compounds of the metals discussed above are only slightly soluble in liquid sulfur and liquid polysulfide. However, these materials can disperse as a discontinuous solid phase throughout and on the porous electrode and adjacent to the electrode and thereby increase the capacity of the battery. This increased capacity results (in the case of electronic conductors) as a result of the establishment of increased electrode area with altered electrode kinetics. In the case of insulators (such as certain oxides) the increased capacity is a result of extended surface which can be wetted by polysulfide and yet remain in contact with the electrode, thereby maintaining polysulfide electrode contact and preventing blocking of the porous electrode by sulfur.

DETAILED DESCRIPTION OF THE DRAWING

The drawing illustrates two individual test cells suitable for illustrating the improvement of the invention. It will be appreciated by those skilled in the art that numerous cell designs would be suitable. Such suitable cells can be prepared in accordance with all prior art techniques and in any desired configuration as long as care is taken to control the presence of metal and metal compounds in the cell, and in particular in the cathodic reactant, throughout the operation of the device.

FIGS. 1 and 2 show two different test cell configurations generally indicated at 2. Each of the cells is prepared in a pyrex container 4 and includes: (a) a tubular conductive ceramic 6 which is sealed to a tubular non-conductive alpha alumina ceramic 8 by glass seals 10; (b) an alkali metal ractant-anode (e.g., sodium) 12 within the tube formed of said ceramic; (c) a lead 34 immersed in the alkali metal 12 and leading to an external circuit; (d) a porous graphite electrode 14 immersed, when the cell is in the theoretically fully charged state, in molten sulfur 30 to the level indicated; and (e) metal or metal compound additives 16. Since each of the illustrated cells is prepared in a glass contaiiniler (an insulator) to avoid corrosion problems, the container cannot be used as an electrode. Thus, it is necessary to insert a cathode into each cell. The electrode for the test cell of FIG. 1 comprises a graphite rod 18 which is in electrical contact with a machined graphite block 20 which in turn is in electrical contact with graphite felt 14. The electrode structure shown in FIG. 1 also includes a graphite thread reference electrode 22 which is separated from said tube 18 by a pyrex tube 24. This reference electrode is merely included for testing purposes. The cathode for the cell of FIG. 2 consists of a graphite rod 26 which is in electrical contact with a graphite cyclinder 28 which in turn electrically contacts graphite felt 14.

The cell of FIG. 2 differs from that of FIG. 1 in two other significant respects. FIG. 3 is a cross-sectional view of the cell of FIG. 2 taken along line 3—3. As can be seen, graphite electrode 14 is shaped such that the cathodic reaction zone (i.e., the zone bounded by graphite ring 28 on the outside and conductive ceramic 6 on the inside contains channels which are free of porous felt 14 and through which cathodic reactant 30 can flow. The cell is designed in accrodance with and is representative of the teachings of Ser. No. 545,048 discussed above. A second feature of the cell of FIG. 2 is that the porous felt electrode is inserted in slabs or sections. FIG. 4 is a perspective view of one of these sections. The use of such sections simplifies construction of the cell and provides a way of distributing additives within the cathodic reaction zone. Thus, the additives 16 can be sprinkled on the top of each section of felt as it is added and then the next section of felt applied. As is shown in FIG. 4, to an extent, the particles or powder will filter down through each section and be distributed throughout the porous felt electrode. This method of cell construction is, of course, merely representative of a number of different ways of preparing such cells.

EXAMPLES

The following examples are presented merely as an illustration of the improvement of the invention and are not intended to be limiting.

A series of sodium-sulfur cells of the type shown in FIG. 1 were assembled. In this series, the machined graphite block 20 was 1-½ inches in diameter and 1-7/16 inches high. The porous graphite electrode 14 was made of five slabs of WDF graphite felt (manufactured by Union Carbide Corp.), each being 11/32 inches inner diameter, ¾ inches outer diameter, and ¼ inch thick. The machined graphite parts were bonded using Dylon graphite (GC) cement obtained from Dylon Industries, 14430 Indian Creek, Cleveland, Ohio 44130. These parts, along with the WDF graphite felt slabs were boiled in hot concetrated hydrochloric acid, followed by rinsing with water and drying, to remove acid soluble impurites. The graphite parts were then inserted into pyrex container 4. Metal additives 16 were added at the time of insertion of the WDF graphite felt slabs by sprinkling them on top of each slab as it was inserted in the container. The alpha-beta alumina ceramic assembly illustrated in FIG. 1 was then positioned within the slabs and a sodium reservior attached to the $\alpha$-ceramic 8 with a glass seal. The pyrex container 4 is also attached to the $\alpha$-ceramic 8 with a glass seal. The graphite electrode lead 18 is cemented with Dylon to a wire lead. A vacuum tight seal between the container 4 and the wire lead is made. Graphite to glass seals were made using Torr seal epoxy obtained from Varian Associates, VAcuum Division, Palo Alto, Calif. Before filling the cells with sodium and sulfur, the glass housing 4 was heated in a furnace to 350° C; with both sodium and sulfur compartments being evacuated simultaneously to an approximate vacuum of 0.1 Torr. The cells were then cooled to about 150° C after 1 hour of evacuation and argon introduced into the two compartments. About 19 gms of sulfur and about 35 gms of sodium metal were put into respective filler arms for the two compartments and the compartments reevacuated to about 0.01– 0.1 Torr. Sulfur was melted, allowed to flow into the glass housing 4 which was sealed off under a vacuum of about 0.1 Torr after about ½ hour. The sulfur used was redistilled 99.995% purity grade. Sodium metal was next melted and allowed to flow into the sodium compartment. The temperature of the cell was then raised to the operating temperature (300° C) by placing in a furnace. Before sealing the sodiumcompartment under 10 Torr of argon pressure care was taken that the molten sodium had wt the walls of the $\beta$-ceramic 6. The sodium comartment was then sealed and the cell was ready for testing the performance and durability. The summary of the test parameters and results are set forth in Table I. Cells containing metal additives exhibit significantly increased capacity over cells which are free of metals or metal compounds.

In view of this disclosure, many modifications of this invention will be apparent to those skilled in the art. It is intended that all such modifications which fall within the true scope of this invention be included within the terms of the appended claims.

TABLE I

| Cell | Ceramic Composition % $Na_2O$; %$Li_2O$; balance $Al_2O_3$ | Additives to Sulfur Compartment (Material % of Sulfur, weight) | Temperature | Charging Current Density (ma/cm$^2$) | Charging Current Density (ma/cm$^2$) | Test Duration (Days) | Specific Capacity (Ah/cm$^2$) | Charge Transported (Ah/cm$^2$ each Direction) | Extent of two phase operation |
|---|---|---|---|---|---|---|---|---|---|
| E-10 | 8.70,0.70 | Fe,1.0 | 300 | 31–125 | 250 | 6 | 0.18–0.25 | | Limited |
| | | | 360 | 31–94 | 50–125 | 13 | 0.67–0.79 | | Good |
| | | | 360 | 125 | 50 | 2 | 0.49 | | Good |
| | | | 300 | 125 | 250 | 11 | 0.19 | | Fair |
| | | | 300 | 31 | 62–125 | 4 | 0.38–0.44 | | Good |
| | | | 300 | 125 | 250 | 6 | 0.16 | 57 | Limited |
| | | | | | | Total 48 | | | |
| E-11 | 9.25,0.25 | SS446,1.0 | 300 | 125 | 250 | 50 | 0.14–0.19 | | Limited |
| | | | 375 | 125 | 250 | 11 | 0.44 | | Good |
| | | | 300 | 125 | 250 | 38 | 0.14–0.19 | | Limited |
| | | | 375 | 125 | 250 | 1 | — | 198 | — |
| | | | | | | Total 102 | | | |
| E-12 | 9.25,0.25 | Cr,1.0 | 300 | 125 | 250 | 62 | 0.16–0.22 | | Limited |
| | | | 375 | 125 | 250 | 11 | 0.44 | | Good |
| | | | 300 | 125 | 250 | 11 | 0.19 | | Limited |
| | | | 375 | 125 | 250 | 11 | 0.62 | | Good |
| | | | 300 | 125 | 250 | 26 | 0.28–0.44 | 246 | Good |
| | | | | | | Total 126 | | | |
| E-13 | 8.70,0.70 | SS446,10 | 300 | 125 | 250 | 7 | 0.1–0.17 | | Limited |
| | | | 300 | 50 | 125 | 1 | 0.25 | | Fair |

TABLE I-continued

| Cell | Ceramic Composition % Na$_2$O; %Li$_2$O; balance Al$_2$O$_3$ | Additives to Sulfur Compartment (Material % of Sulfur, weight) | Temperature | Charging Current Density (ma/cm$^2$) | Charging Current Density (ma/cm$^2$) | Test Duration (Days) | Specific Capacity (Ah/cm$^2$) | Charge Transported (Ah/cm$^2$ each Direction) | Extent of two phase operation |
|---|---|---|---|---|---|---|---|---|---|
| | | | 375 | 50 | 100–125 | 4 | 0.49–0.75 | | Good |
| | | | 375 | 125–250 | 250 | 5 | 0.34–0.38 | | Good |
| | | | 300 | 50–125 | 100–250 | 34 | 0.25  0 | 96 | Limited |
| | | | | | | Total 55 | | | |
| E-15 | 9.25,0.25 | SS446,0.1 | 300 | 125 | 250 | 6 | 0.16 | | Limited |
| | | | 300 | 50 | 100 | 2 | 0.30 | | Fair |
| | | | 375 | 50 | 100 | 3 | 0.75 | | Good |
| | | | 375 | 125 | 250 | 3 | 0.5 | | Good |
| | | | 375 | 250 | 250 | 1 | 0.25 | | Good |
| | | | 300 | 125 | 250 | 48 | 0.28 | | Fair |
| | | | 375 | 125 | 250 | 11 | 0.38 | | Good |
| | | | 300 | 125 | 250 | 53 | 0.25 | 247 | Good |
| | | | | | | Total 132 | | | |
| E-20 | 8.70,0.70 | Fe,0.05 | 300 | 125 | 250 | 5 | 0.2 | | Limited |
| | | | 300 | 50 | 100 | 3 | 0.28 | | Fair |
| | | | 375 | 50 | 100 | 4 | 0.75 | | Good |
| | | | 375 | 125 | 250 | 3 | 0.6 | | Good |
| | | | 375 | 250 | 250 | 4 | 0.33 | | Fair |
| | | | 300 | 125 | 250 | 6 | 0.2 | 46 | Limited |
| | | | | | | Total 31 | | | |
| E-21 | 8.70,0.70 | Cr,0.05 | 300 | 125 | 250 | 2 | 0.2 | | Limited |
| | | | 300 | 50 | 100 | 4 | 0.33 | | Fair |
| | | | 375 | 50 | 100 | 4 | 0.69 | | Good |
| | | | 375 | 125 | 250 | 3 | 0.5 | | Good |
| | | | 375 | 250 | 250 | 2 | 0.32 | | Fair |
| | | | 300 | 125 | 250 | — | — | 22 | — |
| | | | | | | Total 21 | | | |

We claim:

1. In a secondary battery or cell comprising:
  A. one or more anodic reaction zones containing a molten alkali metal reactant-anode in electrical contact with an external circuit;
  B. one or more cathodic reaction zones containing
    (i) a cathodic reactant which, when the battery or cell is at least partially discharged, is selected from the group consisting of (a) single phase composition comprising a molten polysulfide salt of said anodic reactant and (b) a two phase composition comprising molten sulfur and molten sulfur saturated polysulfide salts of said anodic reactant and
    (ii) an electrode of porous conductive material which is at least partially immersed in said cathodic reactant, and
  C. a cation - permeable baarrier to mass liquid transfer interposed between and in contact with said anodic and cathodic and cathodic reaction zones, said porous conductive material being in electrical contact with both said cation -permeable barrier and an external circuit,
wherein the improvment comprises increasing the charge/discharge capacity of said battery or cell by including in said cathodic reactant between about 0.001 and about 10 weight percent based on the total weight of the cathodic reactant of and additive selected from the group consisting of:
  i. metals selected from the group consisting of
    a. metals from Groups I, II and III of the Periodic Table of Elements, (b) Transition Series Metals, and (c) antimony, lead, tin and bismuth;
  ii. alloys comprising metals of (i);
  iii. salts of metals of (i);
  iv. oxides of metals of (i);
  v. phosphides, arsenides, antimonides, carbides and nitrides of the metals of (i); and
  vi. mixtures of (i) through (v).

2. A device in accordance with claim 2 wherein said additive is included in an amount of between 0.001 and about 1.0 weight percent.

3. A device in accordance with claim 1 wherein said additive is included in an amount of between about 0.001 and about 0.1 weight percent.

4. A device in accordance with claim 1 wherein said additive is a metal salt selected from the group consisting of halides, nitrates, nitrites, thiocyanates, sulphates, sulfides, hydroxides and mixtures thereof.

5. A device in accordance with claim 4 wherein said salt is included in an amount of between about 0.001 and about 1.0 weight percent.

6. A device in accordance with claim 4 wherein said salt is included in an amount of between about 0.001 and about 0.1 weight percent.

7. A device in accordance with claim 1 wherein said alkali metal reactant is sodium and said cathodic reactant in the theorectically fully charged state consists of sulfur.

8. A device in accordance with claim 7 wherein said additive is included in an amount of 9.001 to about 1.0 weight percent.

9. A device in accordance with claim 7 wherein said additive is included in an amount of 0.001 to about 0.1 weight percent.

10. A device in accordance with claim 1 wherein said porous electrode is disposed within said cathodic reaction zone so as to form a plurality of channels or spaces within said zone which are free of said porous conductive material and which in combination with said porous conductive material are adapted to allow flow within said cathodic reaction zone of said cathodic reactant.

11. In a secondary battery or cell comprising:
  A. one or more anodic reaction zones containing a molten alkali metal reactant-anode in electrical contact with an external circuit;

B. one or more cathodic reaction zones containing (1) a cathodic reactant which, when said battery or cell is at least partially discharged, is selected from the group consisting of (i) a single phase composition comprising molten polysulfide salts of said anodic reactant and (ii) a two phase composition comprising molten sulfur and molten sulfur saturated polysulfide salts of said anodic reactant and (2) an electrode of porous conductive material which is at least partially immersed in said cathodic reactant and which is disposed within said cathodic reaction zone so as to form a plurality of channels or spaces within said zone which are free of said porous conductive material and which in combination with said porous conductive material are adapted to allow flow within said cathodic reaction zone of said cathodic reactant; and C. a cation-permeable barrier to mass liquid transfer interposed between and in contact with said anodic and cathodic reaction zones, said porous conductive material being in electrical contact with both said cation-permeable barrier and an external circuit, wherein the improvement comprises increasing the charge/discharge capacity of the battery or cell by including in the cathodic reaction between about 0.001 and about 10 weight percent based on the total weight of the cathodic reactant of an additive selected from the group consisting of:

i. metals selected from the group consisting of
  a. metals from Groups I, II and III of the Periodic Table of Elements, (b) Transition Series Metals, and (c) antimony, lead, tin and bismuth;
ii. alloys comprising metals of (i);
iii. salts of the metals of (i),
iv. oxides of the metals of (i);
v. phosphides, arsenides, antimonide, carbides and nitrides of the metals of (i); and
iv. mixtures of (i) through (v).

12. A device in accordance with claim 11 wherein said additive is included in an amount of from about 0.001 to about 1.0 weight percent.

13. A device in accordance with claim 11 wherein said additive is included in an amount ranging from 0.001 to about 0.1 weight percent.

* * * * *